United States Patent [19]

Chung et al.

[11] 4,191,790

[45] Mar. 4, 1980

[54] ABRASION RESISTANT POLYESTER CARBONATES

[75] Inventors: Daniel C. Chung, Edison; Dusan C. Prevorsek, Morristown, both of N.J.

[73] Assignee: Allied Chemical Corporation, Morris Township, Morris County, N.J.

[21] Appl. No.: 931,652

[22] Filed: Aug. 8, 1978

Related U.S. Application Data

[62] Division of Ser. No. 842,754, Oct. 17, 1977, abandoned.

[51] Int. Cl.$^2$ .......................... B05D 5/06; B05D 3/02
[52] U.S. Cl. ........................................ 427/164; 264/1; 264/135; 351/166; 427/385 B; 428/409; 428/412; 428/480; 428/483; 428/911
[58] Field of Search .................... 264/1, 135; 351/166; 427/54, 164, 385 B; 428/412, 409, 480, 483, 911

[56] References Cited

U.S. PATENT DOCUMENTS

| | | | |
|---|---|---|---|
| 3,304,196 | 2/1967 | Deichert et al. | 428/412 |
| 3,763,290 | 10/1973 | Sheld | 264/1 |
| 4,018,941 | 4/1977 | Tucker | 428/412 |
| 4,079,160 | 3/1978 | Philipson | 428/412 |

OTHER PUBLICATIONS

Chemical Abstracts, vol. 82, 1975, 100, 295m, p. 147.

*Primary Examiner*—Michael R. Lusignan
*Attorney, Agent, or Firm*—Robert A. Harman

[57] ABSTRACT

Bisphenol-A/terephthalate/carbonate copolymer substrate in direct adhesive contact with a coating layer of polymerized allyl diglycol carbonate, ("ADGC") without substantial penetration of the copolymeric substrate by the coating layer. The coated article is prepared by forming a layer of monomeric ADGC on the substrate, then polymerizing the ADGC by free-radical initiation at temperatures maintained below successively higher limits as the polymerization progresses, whereby to avoid substantial penetration of the substrate by ADGC or its polymers. The resulting article, such as a clear sheet or plate, is abrasion resistant.

2 Claims, No Drawings

ABRASION RESISTANT POLYESTER CARBONATES

This is a division of application Ser. No. 842,754, filed Oct. 17, 1977, abandoned.

BACKGROUND OF THE INVENTION

This invention relates to substantially clear, abrasion resistant, impact resistant composite articles comprising a substrate of melt processable copolyester-carbonate copolymer wherein the molecules consist essentially of relatively short polyester segments composed of the bisphenol-A ("BPA") moiety and about 1 mole, especially 0.8 to 1.3 moles, per 2 moles of BPA of an aromatic dicarboxylic acid moiety, of which a major proportion is the terephthaloyl moiety. These ester segments are connected together in the copolymer by carbonate links and by relatively short, bisphenol-A polycarbonate segments. Such melt processable copolyester-carbonate copolymers wherein the dicarboxylic acid moiety is terephthaloyl, and preparation thereof, are described in copending U.S. patent application Ser. No. 764,623 of Prevorsek and Kesten, filed Feb. 1, 1977 now U.S. Pat. No. 4,156,069, patented May 22, 1979. Furthermore, such copolymers and preparation thereof are exemplified in Example III of the parent application of the above Ser. No. 764,623 (Ser. No. 672,945, filed Apr. 2, 1976 and now abandoned).

The subject polyester-carbonate copolymers are melt processable in the sense that upon molding for 10 minutes at 320° C. to form a plaque, said polymerr changes in viscosity number by no more than 10% as measured in 40:60 weight ratio of tetrachloroethane:phenol at 25° C. and 0.5 gm/dl concentration; and when heated under purified nitrogen for 30 minutes at 350° C. then dissolved as a 2% (gm/ml) solution in dichloromethane, the polymer develops a "yellowness index" per ASTM test number D 1925 using a 2 cm path, of no more than 10.

The further component of the composite articles of this invention is a layer of polymerized allyl diglycol carbonate (hereinafter polymerized "ADGC") which is in direct adhesive contact with the polyester-carbonate copolymer substrate without substantial penetration of the copolymeric substrate by the polymerized ADGC.

It is known to produce hard, abrasion resistant surfaces on bodies of high impact resistant resins such as bisphenol-A polycarbonate resins. One proposed method is described in U.S. Pat. No. 3,763,290 of Oct. 2, 1973 to Sheld. A polyamide interlayer is formed upon the polycarbonate core and an ADGC monomer layer is applied over the interlayer and then is thermally polymerized; e.g. in a closed mold kept in an oven at 65° C. for 12 hours using the conventional catalyst for ADGC polymerization, namely "IPP" (di-isopropyl peroxydicarbonate). The polyamide interlayer protects the polycarbonate core against attack by the ADGC monomer, which would occur and cause haziness bordering on opacity, in absence of such protective layer. See Example 7 of U.S. Pat. No. 3,763,290 above cited.

Another proposal for obtaining a polymerized layer of ADGC upon a body of bisphenol-A polycarbonate resin is the subject of Japanese Patent 74 97,037 (*Chemical Abstracts,* Vol. 82, 1975, 100295m). In accordance with this Japanese patent, the polycarbonate resin article is coated with a low molecular weight polymer or copolymer from ADGC monomer, which low molecular weight polymer is thereafter polymerized by UV radiation. The low molecular weight polymer itself is obtained by UV polymerization and is isolated as a white paste, which is heated to 80° C. and coated onto the polycarbonate article.

SUMMARY OF THE INVENTION

In accordance with the present invention, substantially clear, abrasion resistant, impact resistant composite articles are obtained comprising a substrate of melt processable polyester-carbonate copolymer wherein the ester segments of the molecules are composed of bisphenol-A moieties ("BPA") and terephthaloyl ("TP") moieties in mole ratio in the range between 2:0.8 and 2:1.3 of BPA:TP, said substrate being in direct adhesive contact with a layer of polymerized allyl diglycol carbonate ("ADGC") without substantial penetration of the copolymeric substrate by the polymerized ADGC.

The invention provides also a process of producing such article, which comprises forming, on a substrate of polyester-carbonate copolymer as just described, a layer of monomeric ADGC containing free radical-forming polymerization initiator active at temperature of 50° C.; and maintaining such copolymeric substrate and the ADGC layer thereon under free radical catalyzed polymerization conditions, free of elemental oxygen and at temperatures low enough to avoid substantial penetration of the copolymeric substrate by the monomeric or partially polymerized ADGC.

By "substantial" penetration, is meant penetration sufficient to increase the percent haze of a smooth ⅛th inch thick sheet or plate of the copolymer from a value (per ASTM D 1003-61) of not over 5%, up to a value of 10% or more for a coated plate (2.5"×2.5"×0.125") with a 0.3 mil coating; and/or to result in signs of failure such as visible delamination, haziness or surface cracking at the area of impact on such plate in the "Dart Drop" test. This test involves dropping an 8 pound "dart" (a plummet tapered to a point of 0.5 inch diameter), from a height of 5 feet onto the plate (which is clamped around the edges in a square frame, to leave a 2"×2" square free to respond to the dart). Coated plates as above, wherein penetration of the substrate by the coating layer can be clearly discerned in photomicrographs of sectioned specimens, are undesirably hazy and/or display signs of failure as above described in the Dart Drop test.

PREFERRED EMBODIMENTS

In preferred embodiments of this invention, the composite site article is a coated sheet or plate having (before abrasion) a value for percent haze, measured by ASTM method D 1003-61, of not over 5%, showing after abrasion testing, by the falling grit method of ASTM D 673-70 using 1000 ml of grit, a change in percent age points of haze of not over 10 percentage points, and having notched Izod impact resistance at 25° C. of at least 5 foot-pounds per inch of notch by ASTM method D 256-73 Type A, and Dart Drop test showing no visible delamination, haziness or surface cracking at the area of impact on the plate, using an 8 pound "dart" dropped from a height of 5 feet. The sheet or plate is composed of bisphenol-A/cyclic dicarboxyloyl segments as the polyester moiety, wherein the major proportion of such dicarboxyloyl ingredient is terephthaloyl. A minor proportion of the dicarboxyloyl ingredient can be another aromatic or an alicyclic dicarboxyloyl moiety, especially isophthaloyl. The dicarboxyloyl moiety is present in mole ratio with BPA of at least 0.5 mole per 2 moles of BPA, preferably 0.8–1.3:2 mole ratio.

Preferred process conditions for coating the substrate with polymerized ADGC involve use of the conventional di-isopropyl peroxydicarbonate catalyst; or alternatively another ADGC-compatible, low temperature, free radical polymerization catalyst such as di-n-propyl peroxydicarbonate and di-sec-butyl peroxydicarbonate. In such preferred process the temperature is in the range between 40° and 50° C. during at least the first hour of the polymerization period and thereafter is raised over at least 3 hours in at least 2 stages to at least 100° C; and is maintained at at least 100° C. for a time at least sufficient to polymerize the ADGC to the extent of producing an abrasion resistant surface.

The following example sets forth the best mode presently contemplated by us for carrying out our invention and illustrative of the invention but is not to be interpreted in a limiting sense.

EXAMPLE

A molded plate, 1/16 inch thick, of polyester carbonate having BPA:TP moiety mole ratio of 2:0.8–1.0 produced in accordance with the above cited U.S. application Ser. No. 764,623, Example I thereof, was cleaned with ethanol and dried with air for 2 hours, being maintained as nearly as possible dust-free. The cleaned polyester-carbonate was coated with liquid ADGC containing 6 percent by weight of the conventional "IPP" initiator, which has a half-life, in benzene, of about 4 hours at 40° C. and less than 1.5 hours at 50° C. The coating was applied with a casting rod at a thickness of about 0.3 mil.

A vacuum oven was flushed two times with nitrogen. Under a slow stream of nitrogen, the coated polyester-carbonate plate was heated according to the following schedule.

| Atmosphere | Temperature | Time |
|---|---|---|
| Nitrogen | 45° C. | 1½ Hours |
| Nitrogen | 55° C. | ½ hour |
| Nitrogen | 65° C. | ½ hour |
| Vacuum | 65° C. | 1½ hours |
| Vacuum | 85° C. | 2 hours |
| Vacuum | 100° C. | 6 hours |

The resulting coated plate was tested by the falling grit test (ASTM D 673–70). Using 300 milliliters of grit, the percent haze was 3.9%; whereas before abrasion the plate had percent haze of 1.9%, i.e., the difference in percentage points was 2. Using 1000 milliliters of grit, the corresponding figures found were 8.9% and 2.1% for a difference of 6.8 percentage points.

When a ⅛th inch thick plate was similarly coated, the haze figures for 300 mililiters of grit were 4.7% as compared to 3.5% for the plate before abrasion, for a difference of 1.2 percentage points. Using 1000 mililiters of grit the corresponding figures were 9.3% and 2.7% for a difference of 6.7 percentage points.

The Izod impact resistance, measured by ASTM D 256–73, of the plate of ⅛th inch thickness averaged 7.5 foot-pounds/inch of notch over 8 tests in which the range of variation was from 6.4 to 8.6 foot-pounds per inch.

In the Dart Impact test, the coated plate of 1/8th inch thickness was subjected to the impact of an 8 pound dart falling 8 feet. That impact caused no visible delamination, haziness or cracking. The indentation resulting from a drop of 5 feet was 155 mils. By contrast, a commercial coated polycarbonate polymer, subjected in the same test to the impact of an 8 pound dart dropped 5 feet, showed surface cracking in the area of impact, and indentation of 245 mils.

The 1/16th inch thick plate was subjected to a strain delamination test by stretching a test piece in an Instron tensile tester. In two tests, the yield elongation was 13.0, 13.7% and the first visual surface cracking was at elongation of 17.5, 18.7%. The 1/8th inch plate similarly tested gave yield of 12.8, 13.7% and surface cracking at 19.4, 20.7%. A 1/8th inch thick commercial coated polycarbonate plate similarly tested gave yield elongation of 9.7, 9.6% and surface cracking at 11.8% elongation.

The foregoing test demonstrate the clarity, abrasion resistance, impact resistance and toughness of composite articles in accordance with this invention, making them suitable for uses such as glazing, protective canopies in aircraft, windshields and others wherein transparency, abrasion resistance, and impact resistance and toughness are desirable, together with the resistance to chemicals and radiation of the ADGC coating. Such properties as resistance of the substrate and coating to deterioration by heat and/or radiation can be further improved by incorporating therein stabilizers, coloring matter, etc. provided these do not interfere with the shaping or coating operations or with the desired clarity of the finished article.

We claim:

1. Process of producing a substantially clear, abrasion resistant, impact resistant composite article which comprises forming, on a substrate of polyester-carbonate copolymer wherein the ester segments of the molecules are composed of bisphenol-A moieties and aromatic dicarboxyloyl moieties, predominantly terephthaloyl, in mole ratio in the range between 2:0.5 and 2:1.3 of bisphenol-A:dicarboxyloyl moieties, a layer of monomeric allyl diglycol carbonate, containing free radical-forming polymerization initiator active at temperature of 50° C.; and maintaining such substrate and the allyl diglycol carbonate layer thereon under free radical catalyzed polymerization conditions, free of elemental oxygen and at temperatures maintained in the range between 40° and 50° C. during at least the first 1 hour of the polymerization period and thereafter raised over at least 3 hours in at least 2 stages to at least 100° C. for a time at least sufficient to polymerize the allyl diglycol carbonate to the extent of producing an abrasion resistant surface.

2. Process of claim 1 wherein the catalyst is di-isopropyl peroxydicarbonate.

* * * * *